United States Patent [19]
Dochterman

[11] 3,974,407
[45] Aug. 10, 1976

[54] INDUCTIVE DEVICES AND TERMINATION ARRANGEMENTS THEREOF

[75] Inventor: Richard W. Dochterman, Fort Wayne, Ind.

[73] Assignee: General Electric Company, Fort Wayne, Ind.

[22] Filed: Jan. 28, 1974

[21] Appl. No.: 437,336

[52] U.S. Cl. .................... 310/71; 336/192; 339/97 R; 339/97 P; 339/99 R
[51] Int. Cl.² ...................................... H02K 11/00
[58] Field of Search ............... 310/71, 68; 336/192; 339/96, 97 R, 97 P, 98, 99 R

[56] References Cited
UNITED STATES PATENTS

| | | | |
|---|---|---|---|
| 3,249,908 | 5/1966 | Fuller et al. ............................. | 339/98 |
| 3,391,379 | 7/1968 | Smotherman ....................... | 310/71 X |
| 3,668,301 | 6/1972 | Faulconer .......................... | 339/97 X |
| 3,780,323 | 12/1973 | Swain................................... | 310/43 |
| R26,208 | 5/1967 | Tupper ............................. | 339/96 X |

*Primary Examiner*—Donovan F. Duggan
*Attorney, Agent, or Firm*—Ralph E. Krisher, Jr.

[57] ABSTRACT

Inductive device, more particularly, dynamoelectric machine termination arrangement is formed at least in part by a portion of molded insulation partially covering a core. The termination arrangement includes a connection receiving and retaining portion of the insulation, interconnected lead wire and coil lead. The interconnection is firmly held in place by a wedging member. The termination arrangement provides strain relief and protective insulation for the interconnection. A method of assembling lead wires to an inductive device is also disclosed.

8 Claims, 21 Drawing Figures

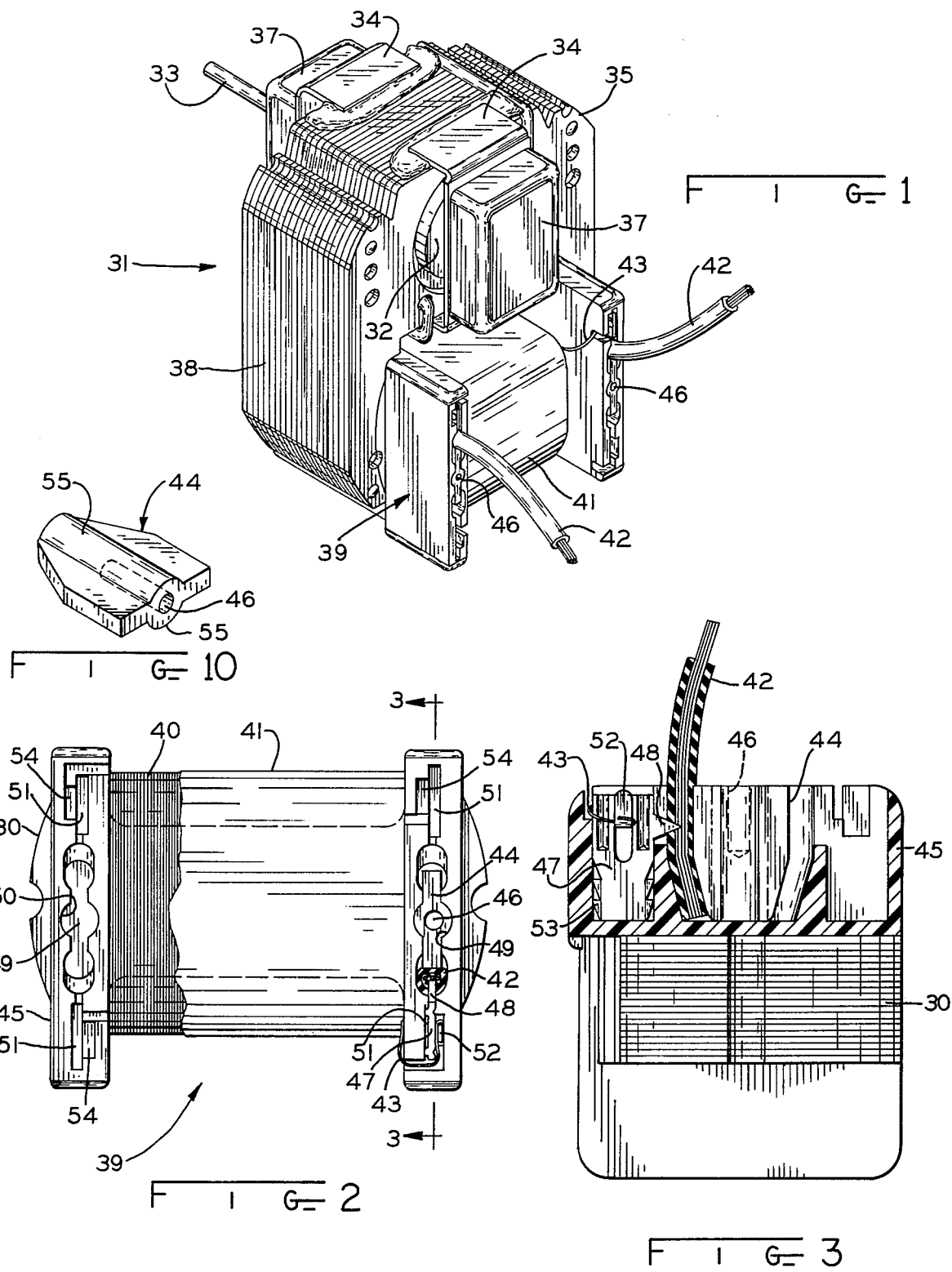

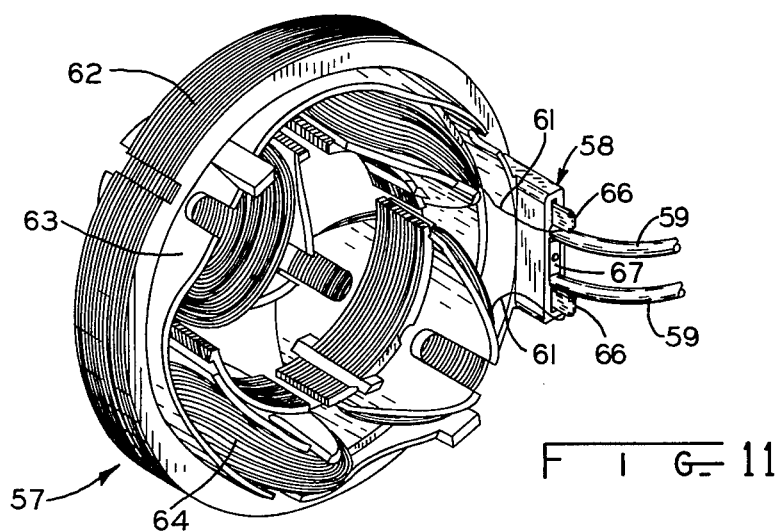
FIG. 11
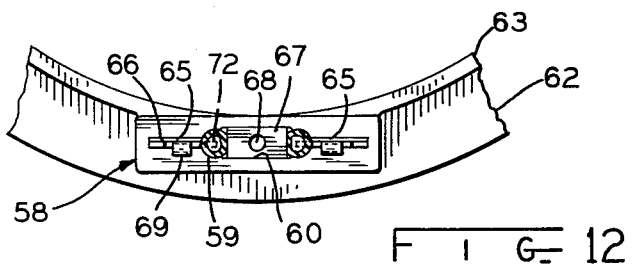
FIG. 12
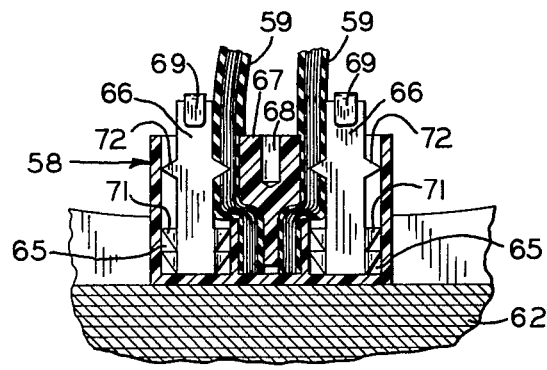
FIG. 13
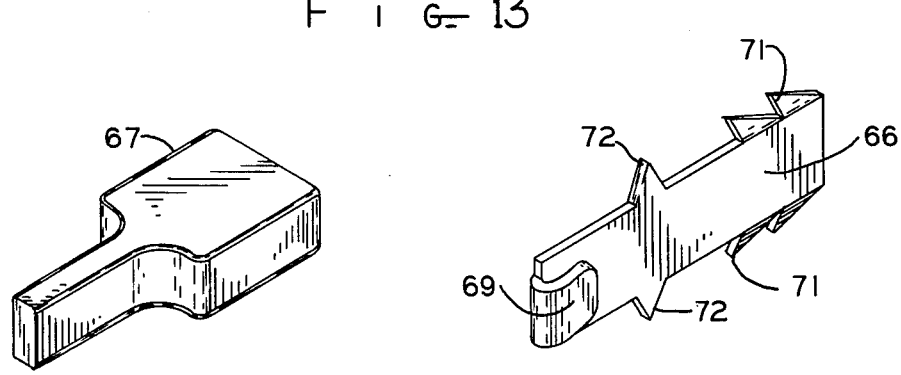
FIG. 14
FIG. 15

INDUCTIVE DEVICES AND TERMINATION ARRANGEMENTS THEREOF

BACKGROUND OF THE INVENTION

This invention relates in general to inductive devices having improved termination arrangements and methods of making the same. The invention is more particularly and concisely described in connection with dynamoelectric machines, e.g., electric motors.

Terminal connections to dynamoelectric machines of the type of particular interest herein may take many diverse forms. Some terminal connectors are of the solder type requiring the stripping of insulation from a wire and then the soldering of the wire to the terminal connector itself. This is a costly and time-consuming operation when performed in a production line, and produces an inflexible circuit connecting arrangement for use in the field. In one prior arrangement a terminal is provided that will accept insulated wires and then the terminal and wires are welded thus melting the insulation on the wires. In these prior arrangements, the terminals must be protected by insulating them and providing strain relief for the lead wire.

There is a definite advantage of forming terminal receptacles in a molded insulating body formed for inductive devices whether these inductive devices are for transformer cores, relays, generators or electric motors. The molded insulation provides a protective covering for the terminal thereby protecting it from physical contact with other conductive elements. Where the insulation is molded in situ an additional economic saving is realized since the additional cost for providing a terminal receptacle as part of the molding is minuscule. Once the molding apparatus is modified to produce the proper molded insulation form and terminal arrangement, all subsequent molded parts are produced without any additional effort.

In many prior approaches the arrangement of parts of a given device using a particular connection scheme is dictated by the connecting or termination approach that is to be followed by an end user of such device, and once such arrangement has been made the device is not readily adaptable to other types of connecting techniques. For example, when one of these approaches is selected, capital expenditures usually are made and product design is relatively frozen vis-a-vis the connections. Moreover, each of the approaches just mentioned have deficiencies. For example, in operations requiring soldering or welding, precautions must be taken to avoid overheating and thus damaging a winding of an inductive device whether such device is a relay coil or winding turns of an electric motor, generator (or alternator), or transformer. In addition, stress relief must be provided for the lead wires so as to avoid breakage or damage during handling, assembling, testing, and final use.

Solutions of the above problems will be discussed in more detail hereinafter with particular reference to electric motors and it will be appreciated that these problems will also be encountered in the manufacture of other inductive devices including those just mentioned. Thus, it will be seen that the resolution of these and other problems would be particularly desirable.

Accordingly, it is an object of the present invention to provide an improved inductive device having a termination arrangement for holding lead connections in a body of insulation.

Another object of the invention is to provide an improved inductive device that includes an insulating body that has an improved termination arrangement and that is positioned to separate winding turn portions and a magnetic core.

Yet another object of the invention is to provide a method of assembling an improved inductive device having a termination arrangement for holding lead connections in a body of insulation.

Still another object of the invention is to provide an arrangement for a plurality of terminals on a dynamoelectric machine.

A further object of the invention is to provide a termination arrangement that affords provisions for optional terminations of an inductive device.

A still further object of the invention is to provide a terminal connector which can be disassembled without damage to the terminal or to the wire.

Another object of the invention is to provide an improved inductive device having a lead wire connection that will withstand normal handling.

SUMMARY OF THE INVENTION

In carrying out the above and other objects in one preferred form, I provide inductive devices, termination arrangements therefor, and methods of making the same which in a more preferred form permits connection of an insulated lead wire without stripping the insulation from the lead wire and without heating or crimping the connection. In embodiments wherein an insulating body is associated with a core and coil assembly, interconnected leads are disposed along selected portions or regions of the insulating body, and a wedging member (accommodated by wedging member accommodating means) is utilized to firmly secure the interconnected leads. In other embodiments an insulating body includes a connection receiving and retaining portion which insulates the connection, and wedge accommodating means that accommodates a wedging member while at the same time providing stress relief. In another form, I provide a method for assembling a lead wire and coil lead of an inductive device. In each of the forms illustrated herein, improved stress relief for at least one lead wire results. In more preferred embodiments of the invention, a lead wire can be removed without damage to the wire or terminal and the same lead wire can be reconnected without requiring any rework.

BRIEF DESCRIPTION OF THE DRAWINGS

For a better understanding of my invention, reference may be had to the accompanying drawings.

FIG. 1 is a perspective view of a fractional horsepower electric motor embodying my invention in one form.

FIG. 2 is an elevational view, with parts removed, of a core and coil assembly portion of the electric motor shown in FIG. 1.

FIG. 3 is a view taken along the lines 3—3 of FIG. 2.

FIG. 4 is a view of a terminal being inserted into a connection receiving and retaining portion.

FIG. 5 is a view of an insulated lead wire being inserted into a wedging member accommodating means.

FIG. 6 is a view of a wedging member being inserted into a wedging member accommodating means.

FIG. 7 is a view of an assembled termination connection.

FIG. 10 is a perspective view of a wedging member that may be used in some embodiments of my invention.

FIG. 11 is a perspective view of a stator core and coil assembly embodying my invention in another form.

FIG. 12 is a plan view of the terminal arrangement of the stator core and coil assembly, with parts removed and parts broken away, shown in FIG. 11.

FIG. 13 is a cut-away side view of the structure shown in FIG. 12.

FIG. 14 is a perspective view of a wedging member used in one form of my invention illustrated in FIG. 13.

FIG. 15 is a perspective view of a terminal that is also shown in FIGS. 11–13.

DESCRIPTION OF THE PREFERRED EMBODIMENTS

Figure 4:
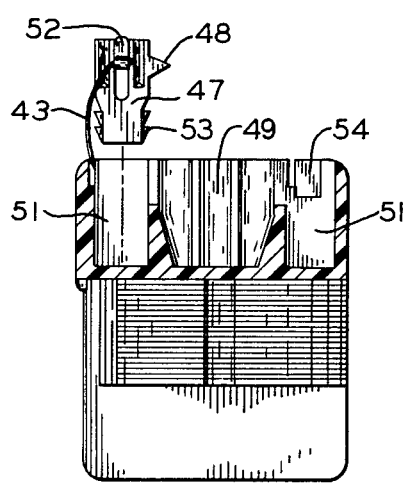
FIGS. 4 through 7 are views somewhat similar to FIG. 3 and illustrating sequentially step-by-step procedures that may be followed in the practice of my invention in one form.

Referring now to FIG. 1, for purposes of illustration, I have shown an electric motor 31 of the shaded pole type for the purpose of describing one preferred exemplification of the invention. The motor 31 conventionally includes a stator 38 and rotor 32, with the rotor being positioned between a pair of oppositely disposed pole faces provided on a main yoke section 35 of stator 38. As will be understood, the rotor is activated during operation by means of magnetic flux which is provided upon excitation of an electrical winding 40 (better seen in FIG. 2) which is supported on core 30 comprised of a stack of coil accommodating magnetic laminations. Thus, the core and coil assembly 39 of motor 31 includes a coil or winding 40 and core 30. The rotor has a rotor shaft 33 extending axially through the rotor and supported by the rotor supporting bearing assemblies 34 which are partially obscured by lubrication reservoir covers 37. Other structural details of the electric motor 31 are not described since they will be understood by persons of ordinary skill in the art.

FIG. 2 is a partial cut-away view of the stator coil and core assembly 39 removed from the electric motor 31 of FIG. 1. The stator coil and core assembly 39 has core 30 which is partially covered by a body 45 of molded insulation. This molded insulation body 45 also forms the receiving and retaining means for the coil lead termination arrangement. Each end or side of molded insulation body 45 (this type of structure sometimes being called a bobbin) forms a termination arrangement portion. Construction and fabrication details of bodies of molded insulation are described in Church U.S. Pat. No. 3,709,457 which issued Jan. 9, 1973, and further detailed description of the general features and characteristics of such molded insulation are not specifically set forth herein. However, the disclosure of the Church patent is specifically incorporated herein by reference. The Church patent is assigned to the assignee of this application.

Electrical winding 40 is covered by electrical insulating tape 41 to protect the outer windings. FIG. 2 shows electrical insulating tape 41 partially cut-away for illustration purposes only. Molded insulating body 45 (as shown in FIG. 2) has four terminal connection receiving and retaining portions 51. The insulating body 45 includes wedging member accommodating means that are illustrated in the form of pockets 49 which are arranged so that one wedging member 44 may be used to make two lead wire connections. The pockets 49, and thus the wedging member accommodating means, are at least partly defined by sidewall portions of the insulating body. These sidewall portions thus constitute an insulated lead wire and wedging member receiving portion of the insulating body. It is expressly noted that the wedging member accommodating means may take other forms. It will be appreciated that the terminal connection receiving and retaining portions could be arranged in a semicircle or in a circular pattern so that one wedging member could be used to make as many terminations as desired. This may be of particular advantage in the case of fractional horsepower electric motors wherein a secondary transformer winding is wound around the stator coil and additional terminals are required for such transformer winding.

Figure 8:
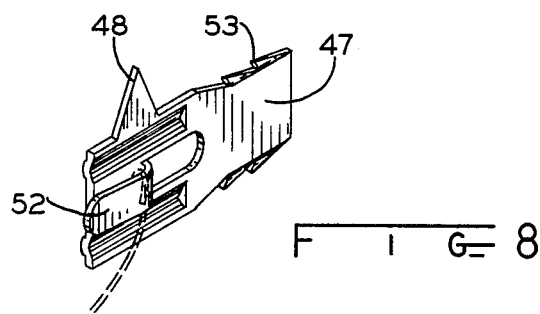
FIG. 8 is a perspective view of a terminal that may be used in embodiments of my invention.

Each terminal connection receiving and retaining portion 51 also has an attaching tab receiving portion 54. These attaching tab receiving portions 54, in each case, are positioned relative to a terminal connection receiving and retaining portion 51 so that a single given design of terminal 47 (as shown in FIG. 8) may be accommodated in any one of the terminal receiving and retaining portions 51. With this approach, one may avoid the necessity of having left and right hand terminals. This description explains why the tab receiving portions 54 associated with the lower (as viewed in FIG. 2) terminal connection receiving and retaining portions 51 are located to the right thereof (again as viewed in FIG. 2) while the tab receiving portions 54 associated with the upper terminal connection receiving and retaining portions 51 are located to the left thereof. It should, however, be understood, that a terminal of different design (as discussed in more detail hereinafter) may be used which would not require left and right tab receiving portions 54 in the molded insulating body.

Attaching tab receiving portion 54 receives coil lead attaching tab 52. Coil lead attaching tab 52 receives coil lead 43. The arrangement described above, of attaching tab receiving portion 54 relative to tab receiving portion 51 is necessary so that terminal 47 with its insulation piercing tang 48 may be used on either end of the stator coil and core assembly thus alleviating the necessity of having left-hand and right-hand terminals.

Wedging member or wedge 44 has a screw receiving hole 46. Once the motor 31 has been fully assembled as shown in FIG. 1 a screw may be inserted into screw receiving hole 46 to facilitate extraction of wedging member 44 and thereby allow removal of the insulated lead wire 42 if required. This quick and easy disassembly is a great convenience during testing and assembling of electric motors or for troubleshooting purposes, and also can enable an ultimate user to make connections in a factory or in the field.

FIG. 3 is a view taken along the lines 3—3 of FIG. 2. This view illustrates how wedging member 44 has forced insulated lead wire 42 into the insulating piercing tang 48 causing insulation piercing tang 48 to penetrate the insulation and resulting in electrical contact between lead wire 42 and terminal 47 which is connected to coil lead 43. Lateral movement of wedging member 44 is prevented by the inter-action of wedging member ridge 55 (better illustrated in FIG. 10) with wedging member accommodating means groove 50 (see FIG. 2). As illustrated, wedging member 44 contains two wedging member ridges 55; but it will be understood that one ridge would be sufficient to prevent lateral movement of wedging member 44. It will be further understood that wedging member 44 could just as easily contain grooves and pocket 49 could have the ridges.

Projections 53 on terminal 47 engage the walls of terminal connection receiving and retaining portion 51, and thereby firmly anchor terminal 47 in the terminal connection receiving and retaining portions 51. It will further be understood that other terminal anchoring means could be used when desired.

FIG. 10 is a perspective view of wedging member 44, illustrating wedging member ridges 55 and screw receiving hole 46. Wedging member 44 can be made from the same insulating material as molded insulating body 45; therefore screw threads for screw receiving hole 46 would not be required since a self-threading screw could be engaged in hole 46. As illustrated, wedging member 44 has two ridges 55.

FIGS. 4-7 are views similar to FIG. 3 and illustrate one series of a step-by-step assembly procedures that may be followed while practicing one form of my invention. In FIG. 4, terminal 47 is shown with coil lead 43 hot-staked to coil lead attaching tab 52. In this view, terminal 47 is ready for insertion into terminal connection receiving and retaining portion 51.

Figure 5:
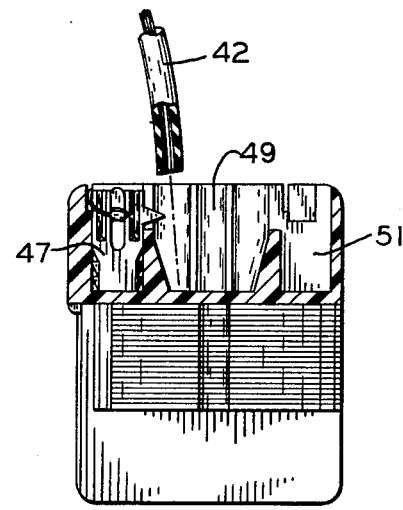

FIG. 5 shows terminal 47 anchored in terminal connection receiving and retaining portion 51 and insulated lead wire 42 ready for placement adjacent terminal 47. Insulated lead wire 42 is shown with a portion of insulating cut-away to better illustrate electrical contact between terminal 47 and the lead wire in subsequent views.

Figure 6:
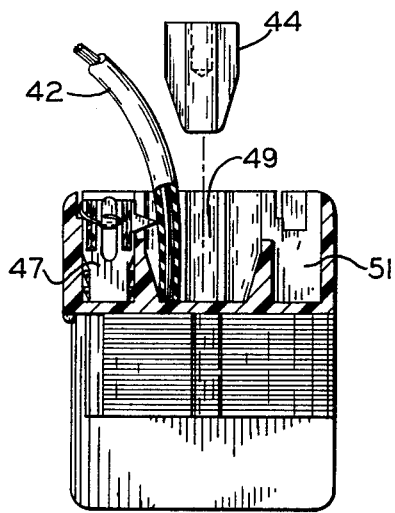

FIG. 6 shows insulated lead wire 42 in position and wedging member 44 ready for insertion into pocket 49. Insulated lead wire 42 and wedging member 44 are both received in pocket 49.

Figure 7:
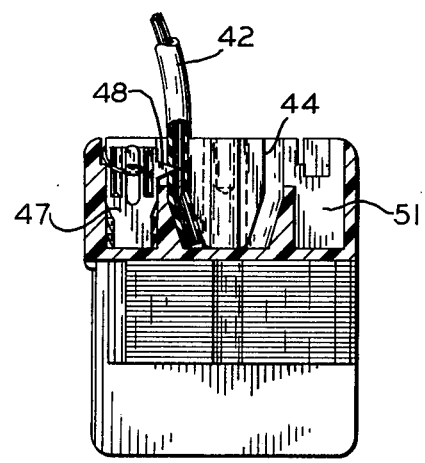

FIG. 7 shows a completed assembly of wedging member 44, lead wire 42, and terminal 47. Wedging member 44 is fully inserted into pocket 49 and insulation piercing tang 48 has penetrated into lead wire 42. If another terminal 47 had been inserted into the vacant terminal receiving and accommodating means 51, and another insulated lead wire positioned next to it the single illustrated wedging member 44 could effect a lead wire connection at both terminals. Wedging member 44 and insulation piercing tang 48 cooperate to retain lead wire 42 in place. Normal handling encountered in testing and assembling will not cause breakage or degradation of the electrical connection.

From the above description, it will be noted that insulated lead wire 42 has been electrically connected to a stator winding without stripping the insulation from the lead wire or performing a crimping, soldering or welding operation on lead wire 42. The resulting terminal connection is fully protected by insulation and no additional strain relief is required.

FIG. 8 is a perspective view of terminal 47 whose function is fully described above. The terminal has anchoring projections 53, insulation piercing tang 48, and coil lead attaching tab 52. A coil lead wire is shown in phantom attached to tab 52.

Figure 9:
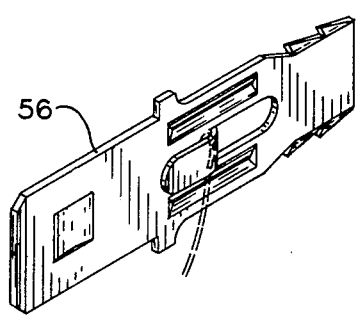
FIG. 9 is a perspective view of a male spade terminal of a type that is known, per se, in the prior art, but that can be optionally used in structures that embody some features of my invention.

FIG. 9 is a perspective view of a male spade terminal of a type that is known per se in the prior art but that can be optionally used in structures that utilize my invention. Male spade terminal 56 can be used in place of or in combination with insulation piercing terminal 47.

FIG. 11 shows a stator coil and core assembly 57 used in a salient pole electric motor that embodies my invention in another form. The stator core 62 is composed of laminations and has a body 63 of molded insulation partially covering said stator core 62. Formed as part of the molded insulation is terminal arrangement 58 which defines wedging member accommodating means that have been illustrated as a pocket 60. Since this type of molded insulation is described in more detail in Swaim U.S. Pat. No. 3,780,323 which issued Dec. 18, 1973, further detailed description of the general features and characteristics of such molded insulation will not be specifically set forth herein; and the disclosure of the Swaim patent is specifically incorporated herein by reference. The Swaim patent is assigned to the assignee of this application.

Coil leads 61 are the end of coil winding 64 and are attached to terminals 66. Terminal arrangement 58 encloses two insulation piercing terminals 66, two insulated lead wires 59, and one wedging member 67. Since coil winding 64 has two coil leads 61, two terminals 66 are shown. But it will be understood that more terminals could be provided if required.

FIG. 12 is a plan view of a stator coil and core assembly 57 showing the part thereof that contains terminal arrangement portion 58. This view shows two insulated lead wires 59 held in place by wedging member 67 and insulation piercing tang 72. Wedging member 67 is received in wedging member accommodating means 60. Also shown in this view is coil lead attaching tab 69 located on insulating piercing terminal 66. Wedging member extracting hole 68 can be used to receive a screw to aid in the extraction of the wedge which then will allow removal of insulated lead wires 59. This provides for easy disassembly of the terminal connection arrangement. The same lead wire 59 and wedging member 67 can be reused to reassemble the connection if desired. Terminal arrangement 58, as illustrated, forms two terminal connection receiving and retaining portions that have been shown as recesses 65.

FIG. 13 is a cut-away view of terminal arrangement portion 58 mounted on a portion of stator core lamination 62. Anchoring projections 71 firmly anchor terminal 66 in recess 65 of terminal arrangement portion 58. FIG. 13 illustrates one assembled embodiment of my invention. The termination connection is firmly held in place and no further strain relief is required to protect the connection.

FIG. 14 is a perspective view of wedging member 57. It will be understood that wedging member 67 could have a different physical configuration and still perform its intended wedging function.

FIG. 15 is a perspective view of terminal 66 showing two insulation piercing tangs 72 anchoring projections 71 and coil lead attaching means 69. Although I prefer to hot-stake coil lead 61 to coil lead attaching tab, other modes of connection may be used. Terminal 66 is shown with insulation piercing tang 72 on two edges; this allows terminal 66 to be used in either a left-hand or right-hand position in terminal arrangement portion 58. It will be understood that a terminal similar to terminal 66 could be used in the arrangement of FIG. 1. Conversely, a terminal similar to that shown in FIG. 8 could be used in the structure of FIG. 11.

The practice of a preferred form of my method as applied to the assembly of the above described terminal arrangements will now be set out with more specific terms. Initially, I attach a coil lead wire (e.g. by hot-staking) to an insulation piercing terminal. I then insert the insulation piercing terminal into a terminal connection receiving and retaining portion of a molded insulation body. Thereafter, I position an insulated lead wire in a wedging member accommodating means adjacent the insulation piercing terminal. Next, I insert a wedging member into the wedging member accommodating means forcing the insulated lead wire into an insulation piercing tang protruding from the insulation piercing terminal and cause the tang to penetrate through the insulation on the lead wire and effect an electrical connection between the lead wire and the terminal which results in an electrical connection between the coil lead and lead wire. It will be understood that the particular sequence of performing steps as discussed above is for purposes of description only, and that other sequences may be followed. With particular reference to the procedure or step of interconnecting a coil lead to a terminal and inserting the terminal into a portion of an insulating body; "interconnecting (or attaching) and the inserting" is to be understood as being the same as, and equivalent to "inserting (a terminal) and then interconnecting (or attaching) a coil lead to such terminal".

The wedging member is generally tapered and has camming surfaces which exert a force against an insulated lead wire pushing the lead wire into an insulation piercing tang. The wedging member is tapered to facilitate its insertion into the wedging member accommodating means.

Figure 16:
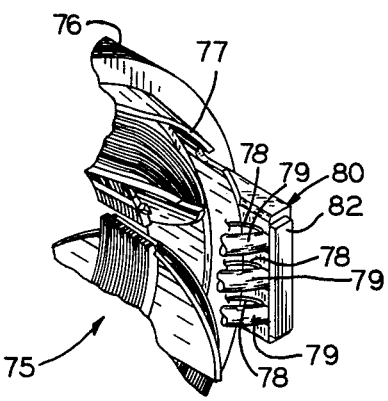
FIG. 16 is a perspective view of a portion of a stator core and coil assembly (with parts removed and parts broken away) embodying my invention in another form.

Another termination arrangement that embodies features of my invention is illustrated in FIG. 16. In FIG. 16, a winding termination mounting 80 is shown on a part of a salient pole stator coil and core assembly 75. Winding termination mounting 80 is a molded portion of an insulating body supported by the laminations 76. In this embodiment, coil lead wire 78 is crimped to a lead wire 79 and held in the winding termination mounting 80 by a wedging member 82. There are three coil lead wires 78 and three lead wires 79 shown in this view and also in FIGS. 17, 18, and 19.

Figure 17:
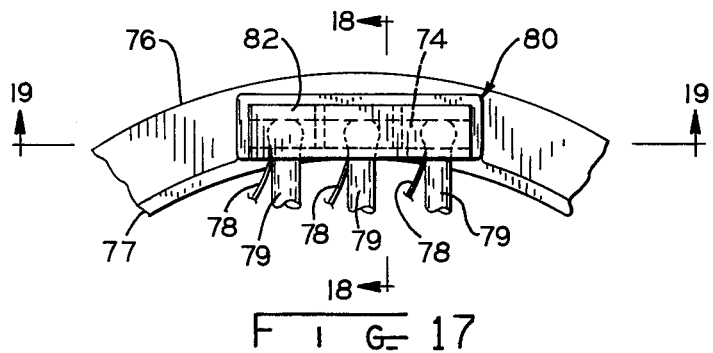
FIG. 17 is a plan view of a portion of the structure illustrated in FIG. 16.

In FIG. 17, wedging member 82 is shown in the wedging member accommodating means 74 which is formed within the mounting 80.

Figure 18:
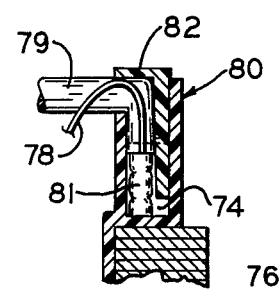
FIG. 18 is a view taken along the lines 18—18 in FIG. 17.

FIG. 18 is a view taken along lines 18—18 of FIG. 17. This view shows the wedging action of wedging member 82 retaining coil lead and lead wire connection firmly in winding termination mounting 80. Wedging member 82 is located in wedging member accommodating means 74. Crimping sleeve connector 81 is shown fully protected by the molded insulation forming termination mounting 80.

Figure 19:
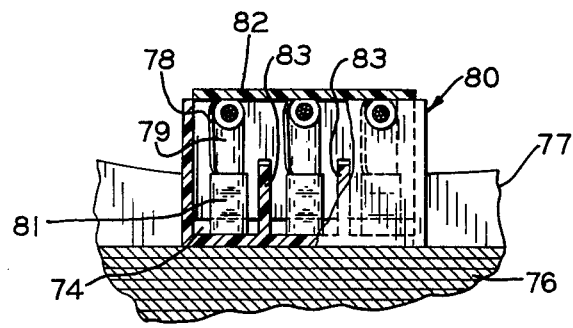
FIG. 19 is a view of the structure of FIG. 17, with parts in section and parts broken away, and taken generally in the direction of the lines 19—19 in FIG. 17.

FIG. 19 is a view along lines 19—19 of FIG. 17. Three lead termination connections are shown but it will be recognized that more or less could be used as required. The terminations are protected from each other within winding termination mounting 80 by insulating partitions 83 that may be separate pieces or may be molded as an integral part of termination mounting 80.

Figure 20:
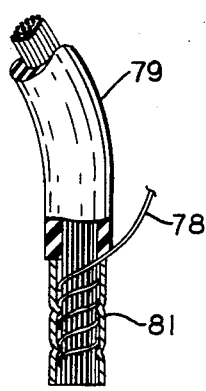
FIG. 20 is a cut-away view of the coil lead and lead wire connection that is also shown in FIG. 18.

FIG. 20 is a cut-away view illustrating the connection of lead wire 79 and coil lead 78. Crimping sleeve connector 81 is shown effecting the electrical connection between lead wire 79 and coil lead 78. Of course it will be understood that other methods of attaching coil lead 78 to lead wire 79 could be used.

Figure 21:
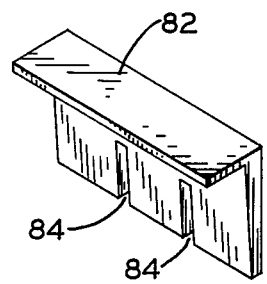
FIG. 21 is a perspective view of a wedging member that is also shown in FIGS. 16–19.

FIG. 21 is a perspective view of wedging member 82 as used in the assembly shown in FIGS. 16–19. Wedging member 82 has slots 84 that accommodate insulating partitions 83. The number of slots required is dependent upon the number of insulating partitions utilized in the winding termination. The wedging member is L-shaped with the portion having slots 84 being thinnest at its outer end and tapering to its maximum thickness at the angle producing portion.

In assembling the above-described termination arrangement of FIG. 17, I first interconnect the coil lead 78 and lead wire 79. The interconnection is then inserted into winding termination mounting 80 adjacent insulating partition 83. Coil lead 78 and lead wire 79 are then bent over an edge of winding termination mounting 80 so as not to interfere with insertion of wedging member 82. Wedging member 82 is now forced into winding termination mounting 80 along side the interconnection of coil lead 78 and lead wire 79 in the area called wedging member accommodating means 74. The wedging member firmly holds the interconnection within winding termination mounting 80.

In each of the above-described arrangements, a winding termination arrangement is provided that includes a portion of a molded insulating body. The molded insulating body partially covers an inductive core assembly or, particularly as herein illustrated, the insulation partially covers a stator core assembly. The termination arrangement includes insulation protection for the termination connection and also employs a wedging member to afford retention of the termination connection.

The molded insulating body can be made from any suitable material. For example, one resin I have used which is commercially available is described as a thermoplastic polyester material which is marketed under the registered name VALOX resin by the General Electric Company. Other exemplary commercially available materials that could be used are polyamide resins that are marketed under the registered name ZYTEL resin by the E. I. du Pont de Nemours & Co., Inc.

It should be understood, however, that the material chosen for use may be any suitable thermoresponsive material, i.e., thermoplastic or thermosetting. It would be preferrable to make the wedging member from the same material as the molded insulating body. However, the wedging member could be made from any suitable material.

The molded insulating bodies shown herein are molded in situ on a magnetic core. However, my invention may be embodied in structures wherein an insulating body is molded and then placed on an inductive core. It is not necessary for the insulating body to be one integral unit.

In each of the above described arrangements, a coil lead and lead wire termination connection is provided which incorporates strain relief for the lead wire. Thus, no other strain relief is required.

While the present invention has been described with reference to particular embodiments and exemplifications thereof in accordance with the Patent Statutes, it is to be understood that modifications may be made by those skilled in the art without actually departing from the invention. Therefore, I intend in the appended claims to cover all such equivalent variations as come within the true spirit and scope of the invention.

What I claim as new and desire to secure by letters patent of the United States is:

1. For use in a dynamoelectric machine: a stator comprising a wound coil and core assembly, an insulating body supported on the core assembly to form part of the stator core assembly and to provide an insulation barrier between at least part of the wound coil and at least part of the core assembly, and at least one termination arrangement; said insulating body including at least one connection receiving and retaining portion that forms a part of the at least one termination arrangement; at least one lead wire interconnected with at least one coil lead, the interconnected portions of the at least one lead wire and at least one coil lead being disposed within the at least one connection receiving and retaining portion; and at least one wedging member formed of insulating material received in the at least one termination arrangement in a wedging member accommodating means that is established by the insulating body, said at least one wedging member firmly retaining the interconnected portions of the at least one lead wire and at least one coil lead in place within the at least one connection receiving and retaining portion.

2. An inductive coil and core assembly comprising a magnetic core, at least one coil of wire accommodated by the core, and at least one insulating body having a portion thereof positioned between a portion of the core and at least part of the at least one coil of wire, said at least one insulating body having at least one connection receiving and retaining portion; an interconnected portion of at least one lead wire and at least one coil lead disposed within said at least one connection receiving and retaining portion of the at least one insulating body; said at least one insulating body further having at least one wedging member accommodating means; and at least one wedging member formed of insulating material located in the wedging member accommodating means, said at least one wedging member retaining the interconnected portions of the at least one lead wire and the at least one coil lead within the at least one connection receiving and retaining portion.

3. An inductive core and coil assembly comprising: a magnetic core; at least one coil of wire accommodated by the core; at least one insulating body having a portion positioned adjacent to the core, said at least one insulating body having at least one connection receiving and retaining portion and further having at least one wedging member accommodating means; an interconnected portion of at least one lead wire and at least one coil lead disposed in said at least one connection receiving and retaining portion of the at least one insulating body; and at least one wedging member located in the wedging member accommodating means, said at least one wedging member retaining the interconnected portions of the at least one lead wire and the at least one coil lead in the at least one connection receiving and retaining portion; said inductive core and coil assembly further including a terminal having an insulation piercing tang projecting therefrom and having the at least one coil lead attached thereto, said terminal being positioned in the at least one connection receiving and retaining portion of the at least one insulating body; said at least one insulating body including at least one insulated lead wire and wedging member receiving portion adjacent to said at least one connection receiving and retaining portion whereby the wedging member forces an insulated lead wire against the tang and causes the tang to pierce insulation on the insulated lead wire to effect electrical contact between the insulated lead wire and the terminal during placement of said at least one wedging member in the wedging member accommodating means.

4. The inductive coil and core assembly of claim 2 wherein said at least one wedging member includes a hole adapted for receiving a screw thereby to facilitate extraction of said wedging member from the wedging member accommodating means.

5. A dynamoelectric machine having a rotor, a stator core, an insulating body supported on said stator core, a winding having at least a portion thereof closely adjacent to said core, and at least one termination arrangement; said insulating body having at least one connection receiving and retaining portion and a wedging member accommodating means; at least one interconnected lead wire and coil lead positioned in said at least one connection receiving and retaining portion; a terminal having an insulation piercing tang with said terminal being interconnected with the at least one coil lead, and positioned in said at least one connection receiving and retaining portion; and at least one wedging member located in the wedging member accommodating means, said at least one wedging member firmly holding the at least one interconnected lead wire and coil lead in position in said at least one connection receiving and retaining portion; said insulating body having at least one insulated lead wire and wedging member receiving portion that defines at least part of the wedging member accommodating means, said insulated lead wire and wedging member receiving portion being adjacent said connection receiving and retaining portion; and said wedging member holding the at least one insulated lead wire in position relative to said insulation piercing tang, the insulation on said insulated lead wire being pierced by said tang whereby electrical contact between said at least one insulated lead wire and said terminal is maintained.

6. The dynamoelectric machine of claim 5 wherein the insulating body is molded in situ on the stator core.

7. A dynamoelectric machine having a rotor, a stator core, an insulating body supported on said stator core, a winding having at least a portion thereof closely adjacent to said core, and at least one termination arrangement; said insulating body having at least one connection receiving and retaining portion and a wedging member accommodating means; at least one interconnected lead wire and coil lead positioned within said at least one connection receiving and retaining portion; and at least one wedging member formed of insulating material located in the wedging member accommodating means, said at least one wedging member firmly holding the at least one interconnected lead wire and coil lead in position within said at least one connection receiving and retaining portion.

8. The dynamoelectric machine of claim 7 wherein said at least one wedging member includes a hole adapted for receiving a screw thereby to facilitate extraction of said wedging member from the wedging member accommodating means.

* * * * *

UNITED STATES PATENT OFFICE
CERTIFICATE OF CORRECTION

PATENT NO. : 3,974,407
DATED : August 10, 1976
INVENTOR(S) : Richard W. Dochterman It is certified that error appears in the above-identified patent and that said Letters Patent are hereby corrected as shown below:

Col. 5, line 13, delete "insulating" and insert --insulation-- line 53, delete "insulating" and insert --insulation--

Col. 6, line 54, delete "insulating" and insert --insulation--

Col. 7, line 45, delete "the" and insert --then--

Col. 10, line 19, after "portion" insert --,-- (a comma)

Col. 10, line 38, delete "in" and insert --within--

Signed and Sealed this

Fifth Day of April 1977

[SEAL]

Attest:

RUTH C. MASON
*Attesting Officer*

C. MARSHALL DANN
*Commissioner of Patents and Trademarks*